Sept. 24, 1968　　　　B. P. DAWES　　　　3,402,641
CUTTING DEVICE AND METHOD
Filed May 4, 1966　　　　　　　　　　　　2 Sheets-Sheet 1
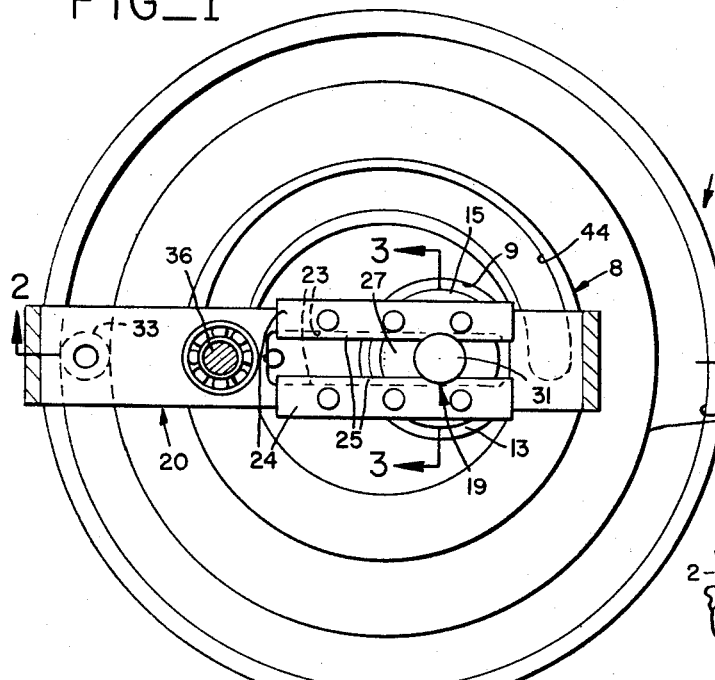
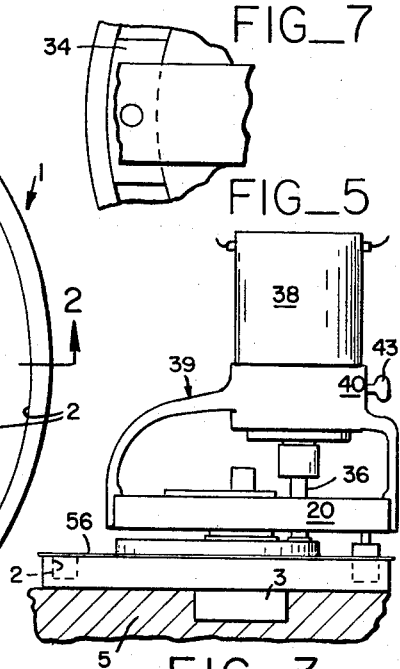
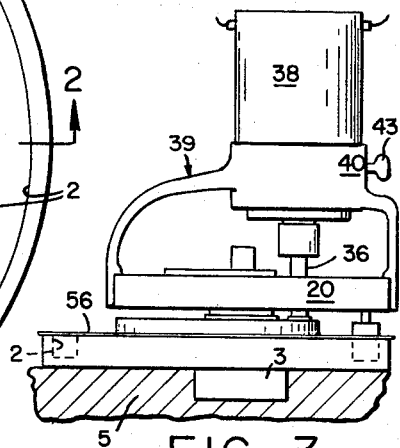
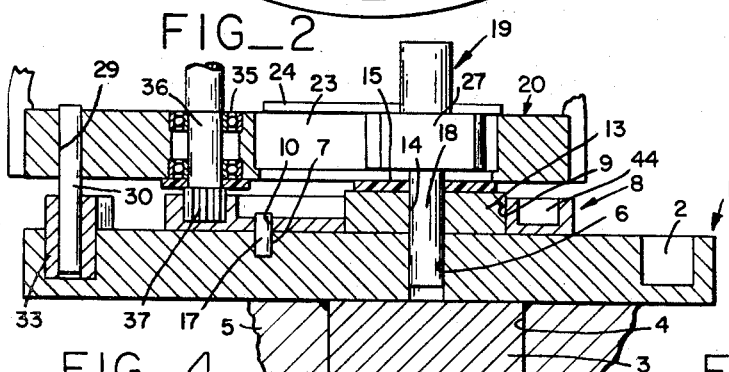
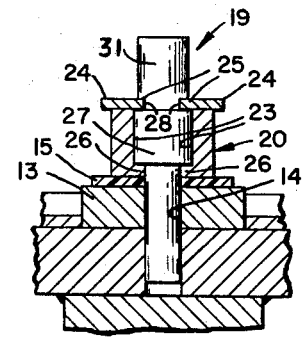
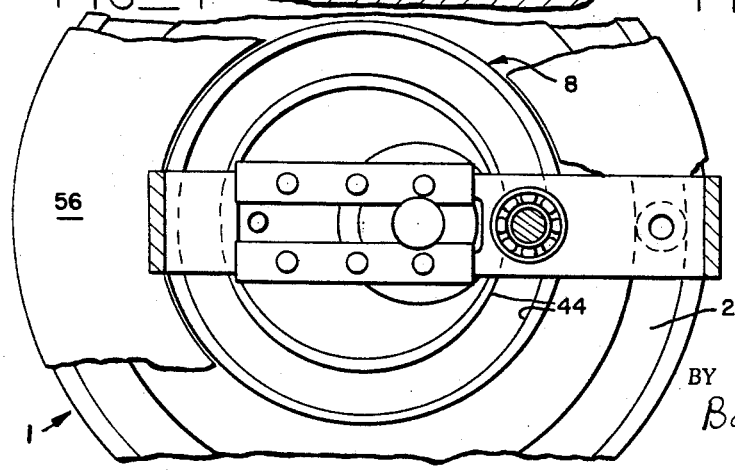
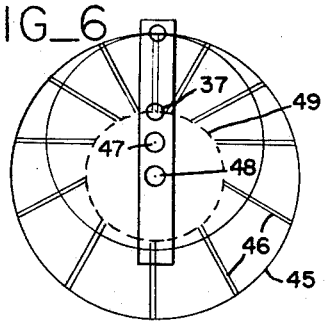
INVENTOR.
BAILEY P. DAWES
BY
Boyken, Mohler, Foster
& Schlemmer
ATTORNEYS

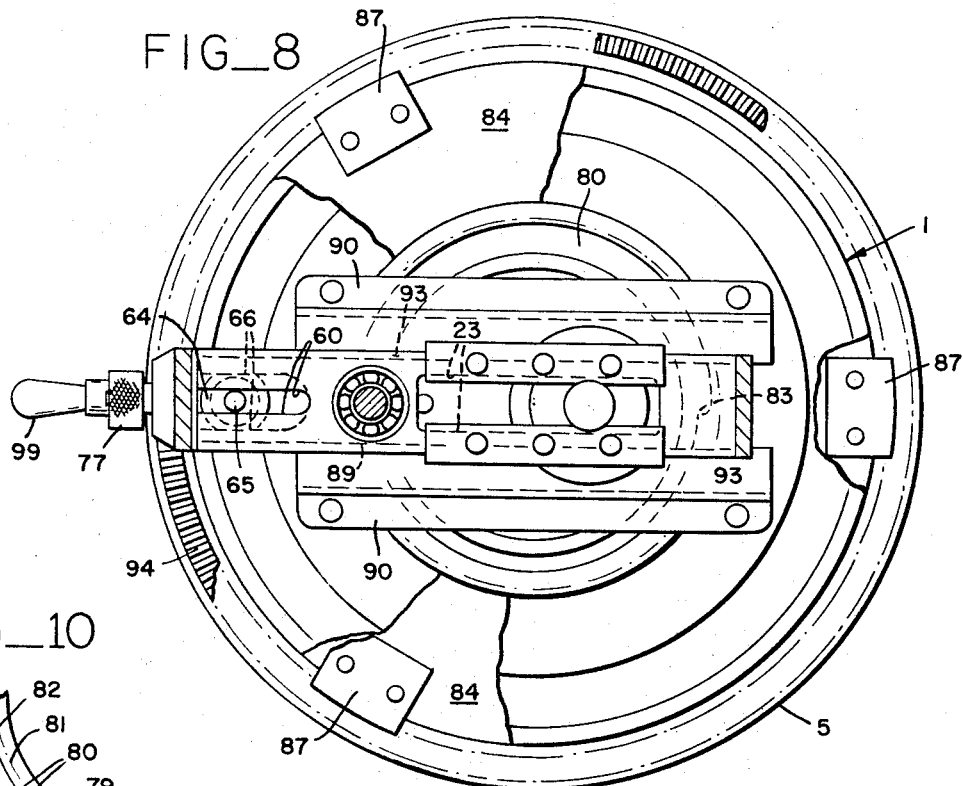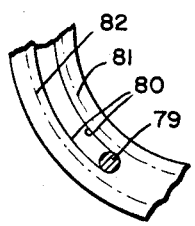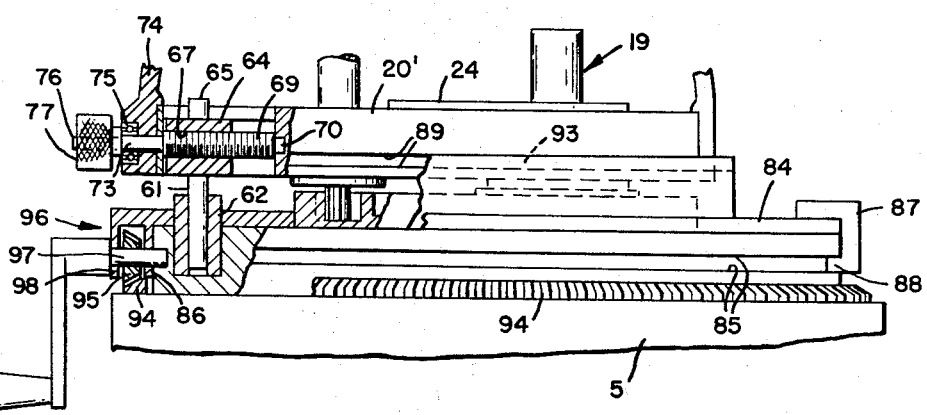

United States Patent Office 3,402,641
Patented Sept. 24, 1968

3,402,641
CUTTING DEVICE AND METHOD
Bailey P. Dawes, 366 Warec Way,
Los Altos, Calif. 94022
Filed May 4, 1966, Ser. No. 547,499
7 Claims. (Cl. 90—13)

ABSTRACT OF THE DISCLOSURE

A device and method for cutting material along an endless line in which a cutter is carried by a supporting arm which is constrained at one end to move along a fixed path and at the other end to pivot about, and move radially with respect to, a fixed axis.

This invention relates to a cutting device for use in cutting material, and has for one of its objects the provision of a cutting device for use in cutting material along a path that is developed by moving and guiding a cutter in cutting relation to said material, about one axis and, at the same time, effecting a radial movement of said cutter relative to a second axis that is parallel with and offset relative to said first axis.

One example of the use of the present invention is in the formation of a cam track that is adapted to follow a fixed point correspondingly spaced radially inwardly on the respective blades of the rotor of a rotary pump, and which blades extend radially of the axis of rotation of the rotor during rotation of the rotor about a center offset relative to the axis of the stator within which the rotor is rotatable. Such a track cannot be cut by any available machine of which I am aware.

One of the objects of the invention is the provision of a machine adapted to cut a cam track as above described.

Another object of the invention is the provision of a method of forming an endless cut within a material.

Other objects and advantages will appear in the description and in the drawings.

In the drawings FIG. 1 is a top plan view of the mechanism exclusive of the motor and motor support, the cutter shaft and motor support being shown in cross section, and the cutter being in a position in which one half of a cam track has been cut.

FIG. 2 is a vertical sectional view taken along line 2—2 of FIG. 1.

FIG. 3 is a cross sectional view taken along line 3—3 of FIG. 1.

FIG. 4 is a fragmentary top plan view, similar to FIG. 1, with the cutter in a position at the completion of the cut. Also a cover, not shown in FIG. 1, is shown in position over a guide track.

FIG. 5 is a reduced size side elevation view of the device of FIG. 4 showing the motor and motor support in position on the device.

FIG. 6 is a schematic view illustrating the paths and axes mentioned above and schematically indicating the cutter and its support.

FIG. 7 is a fragmentary top plan view illustrating a sliding shoe in a modified form of the device.

FIG. 8 is a slightly different form of the invention shown in FIGS. 1–5, being a plan view similar to the point of view of FIG. 1.

FIG. 9 is a side elevational view of the device of FIG. 8, partly in section in portions that differ from structure shown in FIG. 2.

FIG. 10 is a fragmentary view illustrating one procedure of cutting a cam track or channel by the device shown in FIGS. 8, 9.

In detail, a base guide member generally designated 1 is in the form of a horizontal plate having a circular upwardly opening channel 2 therein. Member 1 has a downward projection 3 thereon rigid therewith, which projection may be square and removably fitted within a complementarily formed opening 4 in a horizontal, rigid bed 5 for holding said base member 1 against rotation or lateral movement relative to bed 5. Any other suitable means may be provided for holding member 1.

Member 1 is formed with an opening 6 therein that is eccentrically positioned relative to the circular channel 2, and an upwardly opening hole 7 is formed in the member 1 spaced horizontally from opening 6 to the side of the latter of the greatest distance from opening 6 to channel 2.

The material in which a cut is to be made is in the form of a plate 8. This plate is adapted to lie flat against the upper surface of member 1, and it is formed with a relatively large circular opening 9, as compared with opening 6, and it is also formed with a second opening 10 offset to one side of opening 9. These openings 9, 10 are so spaced apart as to be coaxial with openings 6 and hole 7 when said plate 8 is properly positioned on member 1.

A circular disc-like relatively thick block 13 having a central opening 14 formed therein is releasably fitted within the opening 9 in plate 8, and the opening 14 in said block is preferably of the same diameter as opening 6, and a circular disc 15 is positioned on circular block 13. This disc 15 is preferably of plastic material known in the trade as Teflon, and it, in turn, is formed with a central opening that is in register with opening 14.

A dowel 17 fitted in opening 10 and hole 7 secures said opening and hole in registering relation, while the lower, uniform diameter end portion 18 of a pin, generally designated 19, extends through the opening 14 in body 13 and into opening 6 in base member 1, and also through the central opening in disc 15, the outer diameter of said portion 18 being substantially the same as the diameters of the openings through which said portion extends.

When portion 18 of pin 19 extends through the circular block 13 and disc 15 and into opening 6, and when dowel 17 extends through opening 10 in plate 8 and into hole 7 in member 8, the plate 8 will be positively held against rotation and lateral movement relative to base 1.

Positioned above block 13 and disc 15 and supported on the latter is a horizontally elongated arm generally designated 20. Arm 20 is formed with an elongated slot 23 that extends longitudinally of said arm in one end portion of said arm. A pair of parallel elongated plates 24 are secured on the upper side of arm 20, along each side of slot 23, with the adjacent longitudinally extending marginal portions 25 (FIG. 3) of said plates projecting partially over slot 23 along opposite sides of the latter.

The lower portion of slot 23 is restricted by parallel flanges 26 that extend toward each other along opposite sides of slot 23. By this structure the central portion of slot 23 between plates 24 and flanges 26 is enlarged and forms a guideway for a slide element 27 that is formed on the upper end of pin 19.

This slide element 27, which is integral with pin 19, is horizontally elongated and has flat opposite lateral sides that slidably engage the opposite flat sides of the slot 23.

The upper end portion 31 of pin 19 may be of the same diameter as the horizontal thickness of the slide element 27 and grooves 28 in the opposite sides of the pin slidably receive the marginal portions 25 of plates 24, while flanges 26 extend below the slide element 27. The disc 15 provides an anti-friction support for the arm 20 below slide element 27.

The outer end of arm 20 opposite to slot 23 is formed with a vertical opening 29 for the shaft 30 of a roller 33, which roller is adapted to substantially rotatably fit in channel 2. A sliding shoe 34 (FIG. 7) could be substituted for roller 33 in the present example, but where the channel 2 may be more irregular in its length a roller is preferable.

Between the slot 23 and opening 29, or roller 33, the arm 20 is provided with a ball bearing 35 for the vertical shank 36 of a conventional end mill 37.

Rigidly supported on arm 20 for swinging therewith about the vertical axis of pin 19 is a motor 38 that, in turn, is connected with the shank of end mill 37 for rotating the latter. A bracket 39 or any other suitable means supports the motor 38, which bracket is rigidly mounted on arm 20.

The pin 19 is rotatable in opening 6 and, if desired, block 13 may be rigidly secured on the member 1.

The cutting operation may be commenced in any desired manner. Bracket 39, as illustrated, includes a collar 40 (FIG. 5) coaxial with motor 38 and the motor may be secured vertically therein by a set screw 43. The motor, cutter and collar, and pin 19, may be positioned as a unit on arm 20 with pin 19 entering the opening 6, and upon actuation of motor 38 the end mill will cut into the plate 8 and by swinging the motor and arm 20 as a unit about the pin 19 the upwardly opening channel 44 will be cut.

The roller 33 will follow the guide channel 2 during movement of the end mill or cutter 37, and the path of travel of the cutter will be about the axis of pin 19 and will be elliptical.

In FIG. 6 the path of travel of the guide roller 33 is indicated by line 45, which line may also indicate the cylindrical inner surface of the stator of a rotary pump, assuming the plate 8 is to constitute a cam track for cam followers on the pump vanes, the latter being indicated in FIG. 6 at 46.

The central axis of pin 19 is at 47 in FIG. 6, which axis would also correspond to the rotor axis of a rotary pump, while point 48 is the central axis of the stator or line 45. The cutter 37 is so designated in FIG. 6 and it will follow the dotted path 49 to make channel 44. This line 49 corresponds to a uniform point on each vane 46, hence a cam follower on each vane at such point would be guided in channel 44 as the vanes revolve about axis 47. The path 49 is elliptical, not circular.

It is obvious that the channel 2 may have variations thereon which will result in similar variations in the channel 44.

Once a plate 8 is formed by use of the present invention, duplicates may be produced in the conventional manner.

It is to be understood that rotating cutter and arm 20 may be held stationary while member 1 is rotated about the axis of pin 19, and the result will be the same. However, the most convenient manner of operation is the one described.

Insofar as FIG. 4 is concerned, a cover plate 56 is positioned over the channel 2 to prevent chips cut by the end mill from falling into said channel. The plate 8 in the present disclosure is circular as is the member 1, and the cover plate 56 is formed with an opening through which the roller 33 projects. The center of the cover plate is formed with an opening for the circular plate 8 so that the cover plate will be flat against member 1. As the arm 20 is swung about the axis of pin 19 the cover plate will revolve around the plate 8.

The structure shown in FIGS. 8, 9 that is the same as in FIGS. 1–5 will bear the same numerals.

In cutting cam track or channel 44 by the device of FIGS. 1–5, or by the device of FIGS. 8, 9, it is desirable that the opposed surfaces of the channel walls be finished to an exact spacing, and, in most instances, it is desirable that said opposed surfaces be polished.

In the structure of FIGS. 1–5 the end mill 37 is in a fixed position on arm 20 relative to roller 33, and the end mill 37 consequently is of a diameter that is close to width of channel 44 so as to permit finishing and polishing the opposed sides of the channel to a precise spacing. The end mill in the structure of FIGS. 1–5 will follow only one path in its movement about the axis of pin 19.

In the case of relatively soft metals, the end mill 37 may form a relatively smooth sided channel, but in harder metals the simultaneous cutting at opposite sides of the end mill results in irregularities and roughness that require a substantial amount of grinding and polishing to provide smooth sides. As the diameter of the end mill is increased for forming wider channels, particularly in harder metals, the cutting of the channel by a single end mill that is of a diameter substantially equal to the width of the channel, becomes impractical if not impossible. At the best, the opposite sides of the channel 44 will be too rough.

In the form of the invention as shown in FIGS. 8–10 the arm 20' corresponds, in function, to arm 20 in FIGS. 1–5. However, the outer end of arm 20' that supports the cutter is formed with a slot 60 extending longitudinally of said arm. A pin 61 corresponding in function to pin 30 of FIG. 2 has a roller 62 rotatable thereon for positioning in channel 2, said roller corresponding to roller 33.

A block or enlargement 64 (FIG. 9) is on pin 61 at the upper end of the latter and a short pin 65 projects upwardly from, and is rigid with block 64 in axial alignment with the latter, hence it may be, in effect, an upward continuation of pin 61 at the upper side of the enlargement 64. Pin 65 projects into and fits between the sides of slot 60, being of a diameter substantially equal to the width of slot 60.

Slot 60 is formed adjacent to the upper surface of arm 20' and the lower portion of the arm below slot 60 is cut away to provide a lower slot 66 (FIG. 8) that is wider than slot 60, with its sides parallel with and equally spaced from the opposite sides of slot 60. Slots 60, 66 are coterminous at their ends.

Block or enlargement 64 on pin 61 is slidable in slot 66 while the upwardly extending pin 65 is slidable in slot 60.

The block 64 is formed with a central threaded passageway 67 therethrough parallel with slot 66, through which a screw 69 extends in threaded engagement therewith, said screw being midway between the sides of slot 66. The innermost end 70 of screw 69 is unthreaded, and is rotatably supported within a recess formed in the inner end wall of slot 66.

An outer extension 73 of screw 69 is unthreaded and extends through an opening in a motor supporting bracket 74 that in turn, substantially corresponds to bracket 39 of FIG. 5. This bracket 74 may be secured on arm 20' and may also have a bearing 75 that rotatably supports the extension 73 for supporting block 64 within slot 66.

The outermost end of extension 73 may be square for removably fitting in a square sided socket 76 on a finger engageable rotary handle designated 77, and which handle is adapted for manual rotation.

As in the case of arm 20, the arm 20' is provided with bearings 35 for an end mill, but in the present instance the end mill 79 is of a diameter that is substantially less than the desired width of the cam track or channel that is to be formed.

In FIG. 10 the end mill 79 is shown in the initial channel-forming step, and is in the process of cutting a channel 80 that is of substantially less width than the approximate ultimate desired width of the channel. The broken lines 81, 82 show said ultimate width.

Upon the annular channel 80 being completed to the desired depth, the screw 69 is rotated by manual rotation of a knob 77 to move it toward the inner line 81, or toward line 82, to widen the channel, whether the next cuts are made in one pass or several, at either side of the channel 80 is immaterial, the important thing being that the cutting now is at one side only of the end mill, except for end cutting, and thus the resultant surfaces of the sides of the channel will be relatively smooth since the cutter or end mill will be cutting at one side only, instead of "fighting" itself, as it were, at two opposite sides, at the same time.

After the final cuts are made to lines 81, 82 little, if any, polishing is required.

In FIG. 8 the end mill is in the process of widening the channel 80 from one side to the other, the cut that is in the process of being made commenced at point 83. Other cuts at one or the other side of the initially formed channel will always be effected at one side only of the end mill.

It has been found desirable in many instances to provide means for automatically and positively holding arm 20' against upward movement during cutting of the channel in plate 8. One means for doing this is to provide a relatively heavy cover plate 84 that is similar to cover plate 56 of FIG. 4 in that it extends over the upper open side of channel 2 to keep out chips from the cutter 79. The cylindrical radially outwardly facing sides of the circular plate 1 is formed with an outwardly opening groove 85. Plate 84 may be provided with a depending flange 86 that extends over groove 85, and which flange may be cut away at several points for depending lugs 87 that, in turn, have projections 88 (FIG. 9) slidable in groove 85. These lugs are shown at three equally spaced points (FIG. 8), and may be bolted to the cover plate.

The oppositely outwardly facing surfaces of arm 20' are formed with outwardly opening grooves 89 (FIG. 9), and the cover plate 84, in turn, is provided with a pair of parallel angle strips 90 having opposedly inwardly projecting portions 93 extending into grooves 89. Thus upon rotating the cover plate, the arm 20' will be rotated about the axis of pin 19 while the arm 20' may move longitudinally to permit adjustment of the cutter relative to roller 62 while the latter is in channel 2.

The base guide member 1 may be provided with gear 94 rigid therewith, or said gear may be secured on base 5, but in any event it is around the outer periphery of guide member 1, and the teeth may be bevelled to engage the teeth of a bevel gear 95 (FIG. 7) that, in turn, is rotatably carried by the cover plate 84. Flange 86 and extension 96 of the cover plate at one point spaced around the latter are journalled to rotatably support a short shaft 97, with the gear 95 disposed between a portion 98 on said extension and flange 86. Shaft 97 projects outwardly of the portion 98 and is provided with a handle 99 for rotating the gear 95 and thereby effecting rotation of the cover plate, and consequent cutting of the cam track in plate 8, it being understood that the motor 38 is connected with the cutter 79 and is supported on the motor brackets 74.

Any conventional means may be employed for varying the depth of the cut of the end mill during the cutting operation to cut to the desired depth, such as by intermittently lowering the motor and cutter relative to the motor support by other means, and it is obvious that the cutter may be quickly and accurately adjusted for most efficiently cutting the sides of the channel.

It is obvious that changes and modifications in the structure described will occur to those skilled in the art, hence it is to be understood that the invention is to be limited only by the scope of the appended claims.

I claim:

1. A cutting device for cutting material along an endless line that is developed about a pair of space axes eccentrically positioned relative to and spaced from one side of the central axis of a circular path, with all of said axes parallel and in alignment radially of said central axis, (a) a base guide member having an annular channel formed therein about said central axis, including means for supporting thereon and within the annular confines of said channel, the material to be cut;
  (b) a cutter support extending across said base guide member and spaced from the latter for positioning said material between said support and said base guide member,
  (c) pivot means pivotally supporting said cutter support on said base guide member for movement of said support about an axis parallel with and spaced to one side of said central axis;
  (d) a cutter carried by said support for movement therewith about the axis of said pivot means in cutting relation to said material when the latter is positioned between said support and said base guide member and is stationary relative to said material,
  (e) means on said cutter support supporting said cutter for rotation about an axis parallel with the axis of said pivot means and spaced between said channel and said pivot means,
  (f) a guide element on said cutter support extending into said channel for guiding said cutter during said movement of said support about the axis of said pivot means,
  (g) means slidably supporting said cutter support on said pivot means for movement of said cutter toward and away from said central axis upon movement of said cutter support about said pivot means when said guide element is in said channel.

2. In a cutting device as defined in claim 1,
  (h) means for holding said material stationary relative to said cutter support when said material is positioned between said cutter support and said guide member.

3. In a cutting device as defined in claim 1,
  (h) said guide means, cutter and said pivot means being in alignment radially of said pivot means.

4. In a cutting device as defined in claim 1,
  (h) means supporting said guide element on said cutter support for movement toward and away from said cutter for varying the position of said cutter relative to said pivot means and channel for varying the path of travel of said cutter.

5. In a cutting device as defined in claim 4,
  (i) said cutter being an end mill for cutting a channel in the material to be cut upon rotation of said end mill when it is in said cutting relation to said material,
  (j) power means connected with said end mill for rotating the latter,
  (k) means connected with said cutter support for rotating the latter about the axis of said pivot means.

6. In a cutting device as defined in claim 5,
  (l) said means connected with said cutter support for rotating the latter including a cover plate extending over said channel in said base support to prevent chips from said cutter from falling into said channel, and connected with said cutter support for movement with the latter, and
  (m) means connected with said cover plate for rotating the latter about said central axis when said cover plate is in channel-covering position.

7. The method of cutting an endless elliptical channel in a body of material by a cutter, and which channel is coincidental with an endless line that is developed about a first eccentrically positioned axis at one side of the central axis of a circular path and within the latter comprising the steps of:
  (a) positioning said cutter between said circular path and said first axis in channel cutting relation to said body; then
  (b) moving said cutter relative to said body about said first axis and at the same time moving it radially of said first axis along lines of equal length extending from said circular path.

References Cited

UNITED STATES PATENTS

| | | | |
|---|---|---|---|
| 2,315,479 | 3/1943 | Schwartz | 90—15 |
| 2,413,992 | 1/1947 | Noble | 90—15 |
| 2,430,883 | 11/1947 | Miller | 90—12 |

GERALD A. DOST, *Primary Examiner.*